Figure 3A:
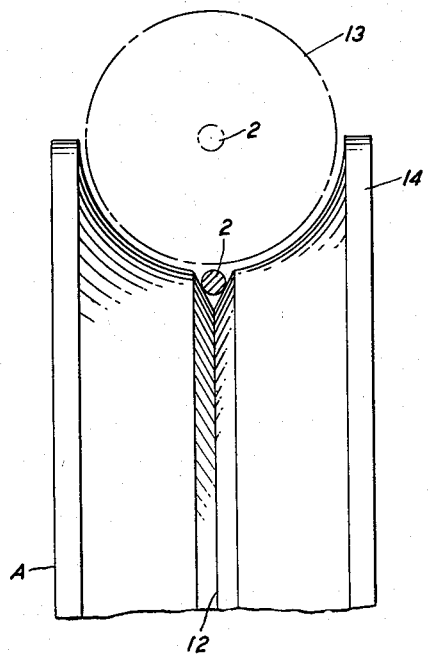

Aug. 15, 1961  R. W. GRETTER  2,996,231
CABLE-HANDLING APPARATUS
Filed May 31, 1960  2 Sheets-Sheet 1
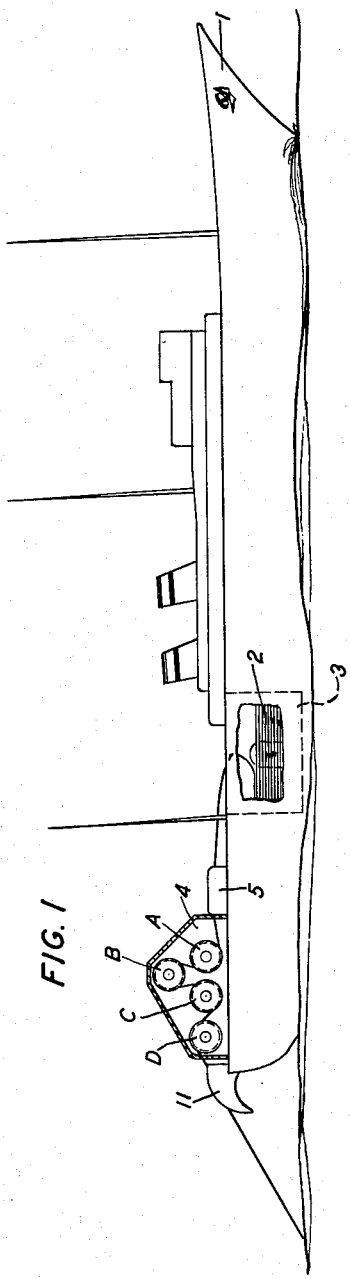
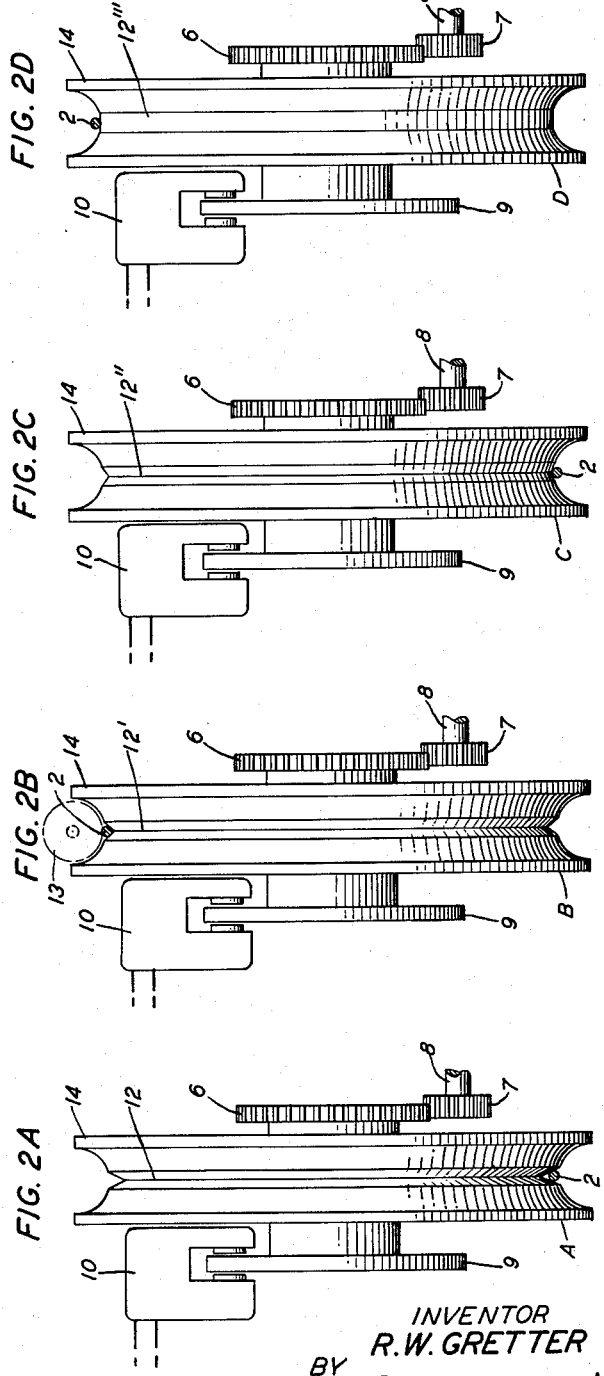
INVENTOR
R. W. GRETTER
BY
*Bob Stoddard*
ATTORNEY Aug. 15, 1961   R. W. GRETTER   2,996,231
CABLE-HANDLING APPARATUS
Filed May 31, 1960   2 Sheets-Sheet 2

INVENTOR
R. W. GRETTER
BY
ATTORNEY

# United States Patent Office 2,996,231
Patented Aug. 15, 1961

2,996,231
CABLE-HANDLING APPARATUS
Ralph W. Gretter, Tewksbury Township, Hunterdon County, N.J., assignor to Bell Telephone Laboratories, Incorporated, New York, N.Y., a corporation of New York
Filed May 31, 1960, Ser. No. 32,789
5 Claims. (Cl. 226—108)

This invention relates to cable-handling apparatus for controlling the rate of movement of a cable passing from a point of low cable tension to a point of high cable tension and, more particularly, to a cable-handling engine having a plurality of improved V-grooved sheaves adapted to operate in tandem for restraining or controlling the passage of a cable through the engine. The invention is especially useful when it is employed for handling ocean communication cable of the armorless type.

In the past, ocean communication cable has been of the type known to those skilled in the art as armored cable and has been fabricated with a heavy external protective sheath or armor comprising, for example, a multiplicity of spirally wrapped layers of steel wire and tape. In addition to protecting the inner communication components of this type of ocean cable, the outer armor also functioned as the chief strength member of the cable because it possessed sufficient strength to withstand the high mechanical tensions encountered during the processes of laying and recovering the cable. Due to the sturdy construction of this armored ocean cable, it has been satisfactorily handled on board a ship by using cable engines employing large sheaves or drums around which the cable was circumferentially wrapped. By making enough cable wraps around a sufficient number of motor-operated sheaves mounted in tandem, the rate of movement of the cable could be adequately controlled.

However, there has recently been developed an entirely different type of ocean communication sable known as armorless cable. This new type of ocean communication cable has its main strength member located in its center in the form of a core made of appropriate strong flexible material, such as stranded steel wires. Immediately surrounding the core member is an inner coaxial communication conductor made of a suitable high conductivity metal, such as copper. The inner conductor is fabricated in the shape of a thin tube or spirally wrapped tape and is formed tightly around the core member. This inner conductor is covered with a suitable plastic dielectric material, such as polyethylene, which is molded in a cylindrical shape around the inner conductor. The plastic cylinder functions as an intermediate dielectric spacing member between the inner conductor and an outer coaxial communication conductor which is also made of a suitable high conductivity metal, such as copper. This outer conductor is fabricated in the form of one or more thin tapes spirally wrapped around the intermediate dielectric cylinder. Protection for this outer conductor is obtained by providing it with a thin external coating, approximately two-tenths of an inch thick, of a suitable plastic insulating material, such as polyethylene or polyvinyl chloride. The resulting cable has an outside diameter of the order of one inch.

During the process of handling ocean communication cable, such as when it is being laid on the floor of the ocean, the cable is usually coiled in a stowage tank in the hold of a ship and is then payed out into the ocean by means of some type of cable-handling apparatus. This apparatus is ordinarily designed to function as a driving force at the beginning of the laying of a cable in order to pull the cable out of its stowage tank and convey it into the ocean. After a sufficient length of cable has been overboarded to pull its own weight, the cable-handling apparatus then functions as a brake for the purpose of controlling the rate of movement of the cable.

From a cable-handling standpoint, the newly developed armorless cable presents an unusual problem which arises from the fact that the interfaces between the several components of this cable are unbonded; that is, there is no chemical cohesion between the inner and outer coaxial conductors and the plastic material. This lack of cohesion is an important factor to be considered during cable-handling operations in view of the fact that the weight of the length of cable that is suspended between the cable-handling ship and the bottom of the ocean produces considerable tension in the cable, especially when the cable-handling operations are being performed in water that is several miles deep. Due to the resulting relatively high cable tension in combination with the lack of cohesion between the cable components, apparatus for handling this type of cable should be so constructed and arranged as to minimize the possibility of excessive shear forces being applied to any one portion of the cable. This is because excessive shear forces might produce internal slippage of the cable components. In particular, the intermediate plastic dielectric material might slip with respect to the inner and outer coaxial conductors with the result that the coaxial conductors might become deformed and thereby impair the signal transmitting qualities of the cable.

Accordingly, an object of this invention is to provide means for minimizing the subjection of an armorless ocean communication cable to excessive shear stresses while it is being handled under tension.

Another object of the invention is to provide an improved cable-handling facility for handling armorless ocean communication cable.

An additional object of the invention is to provide a plurality of improved V-grooved sheaves in a cable-handling engine.

These and other objects of the invention are accomplished by equipping a cable-handling engine with a plurality of improved motor-operated sheaves. Each sheave is constructed with a circumferential V-groove of such size as to receive therein a single wrap of cable. The grooves are formed in such a manner that the number of degrees in the V-angle of each groove is different from the number of degrees in the V-angle of each of the other grooves. The sheaves are mounted in tandem for sequentially engaging a cable and are further constructed and arranged so that the number of degrees in the V-angle of their respective grooves increases progressively from the sheave at the inboard end of the engine, which is a point of low cable tension, to the sheave at the outboard end of the engine, which is a point of high cable tension.

Figure 3B:
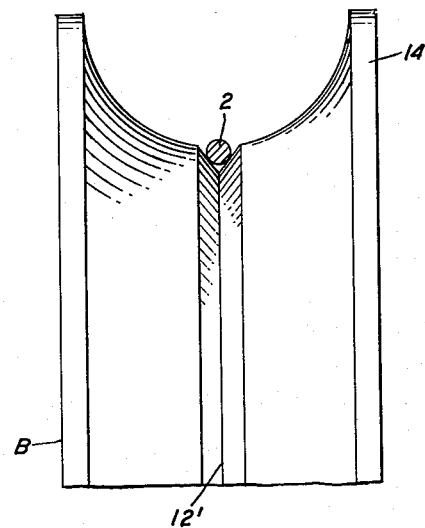
Figure 3C:
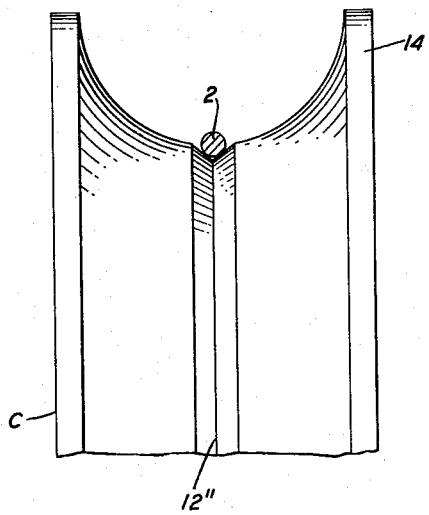
Figure 3D:
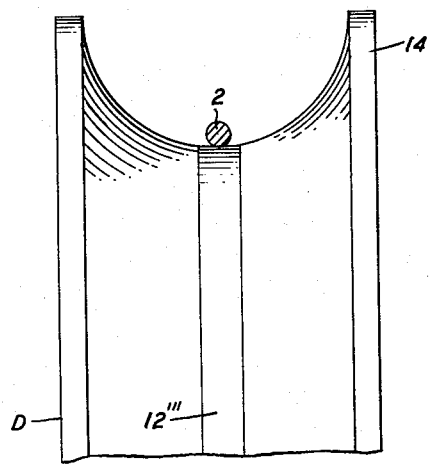

These and other features of the invention are more fully discussed in connection with the following detailed description of the drawing in which:

FIG. 1 is a pictorial representation of a cable-handling ship having mounted thereon a cable-handling engine comprising a plurality of V-grooved sheaves constructed in accordance with this invention;

FIGS. 2A, 2B, 2C, and 2D are end views of respectively different sheaves in the cable-handling engine shown in FIG. 1; and FIGS. 3A, 3B, 3C, and 3D are enlarged end views of the upper portions of the sheaves shown in FIGS. 2A, 2B, 2C, and 2D.

In FIG. 1, a cable-handling ship 1 is represented as carrying a supply of ocean communication cable 2 in a stowage tank 3 located in the ship's hold. The cable 2 travels from the tank 3 to a cable-handling engine 4 which is equipped with a succession of large sheaves A, B, C, and D, all having the same circumferential length and mounted to operate in tandem. The sheaves A, B, C, and D may, if desired, all be arranged in a straight line. However, it may be preferable to mount at least one of the sheaves, such as the sheave B, in a vertically staggered arrangement, as is shown in FIG. 1, in order to reduce the length of the engine 4. The cable 2 moves from one sheave to another in sequence through the engine 4. After leaving the last sheave D, the cable 2 travels down an overboarding chute 11 and passes into the ocean.

The engine 4 also includes driving and braking mechanism of any suitable type known to those skilled in the art for controlling the operation of the sheaves, A, B, C, and D. For example, this mechanism is represented in the drawing as including a plurality of large gears 6 each fastened to a respectively different one of the sheaves A, B, C, and D. Each of the gears 6 is driven by a respectively different one of a plurality of smaller gears 7 connected to a common drive shaft 8 which is driven by a motor 5. The sheaves A, B, C, and D are also provided with brake discs 9 fastened thereto and adapted to be engaged by suitable brake solenoids 10 operable in a manner known to those skilled in the art for retarding the rotation of the sheaves A, B, C, and D.

In order to control the rate of movement of the cable 2 from the inboard end of the engine 4, which is at a point of low cable tension, to the outboard end of the engine 4, which is at a point of high cable tension, the cable 2 is wrapped around a portion of the periphery of each of the sheaves A, B, C, and D in succession. In no instance do these cable wraps completely encircle the entire circumferential length of any one of the sheaves A, B, C, and D because, if the cable 2 overlapped itself, it might become damaged. Since, in this type of cable-handling apparatus, the control of the cable 2 is dependent upon its frictional engagement with the surfaces of the sheaves A, B, C, and D, the total angular extent of contact between the cable 2 and the sheaves A, B, C, and D is selected to be large enough for adequately controlling their rate of movement.

The cable 2 is initially pulled from its stowage tank 3 by operating the motor 5 which, through the gears 6 and 8, effects the rotation of the sheaves A, B, C, and D. Due to the frictional engagement of the cable wraps around the periphery of the sheaves A, B, C, and D, the cable 2 is pulled from its stowage tank 3 and is fed down the chute 11 into the ocean. After a sufficient length of cable 2 has been conveyed into the ocean, its own weight will be sufficient to pull the remainder of the cable 2 out of the stowage tank 3 without using the cable engine 4 as a driving force. When the weight of the overboarded portion of the cable 2 increases further, it will have a tendency to pull the remaining shipboard portion of the cable 2 at such a fast speed that the cable 2 will be liable to form kinks and become snarled and tangled. It then becomes necessary to operate the brake solenoids 10 to retard the rate of rotation of the sheaves A, B, C, and D and to thereby control the rate of movement of the cable 2 so that it will be conveyed smoothly and evenly into the ocean.

As was stated above, in this type of cable-handling engine, the control of the cable 2 is dependent upon its frictional engagement with the surfaces of the sheaves A, B, C, and D. If these sheaves A, B, C, and D were drums having flat circumferential surfaces, then the cable 2 would be engaged by only this one surface on each of the drums and the resulting frictional control would be dependent upon the total extent of the engaged surfaces. However, if the sheaves A, B, C, and D are each formed with a circumferential V-groove of such size as to receive therein the cable 2, then the degree of frictional control will be increased due to the cable 2 becoming wedged between the inclined sides of each of the V-grooves.

Thus, by employing V-grooved sheaves, the same degree of frictional control can be obtained by using a small cable-handling engine that would otherwise be provided by a much larger cable-handling engine having drums with flat peripheral surfaces. This reduction in size is an important advantage since the amount of available space on the deck of a cable-handling ship is limited.

Care should be exercised in selecting the number of degrees in the V-angle of the grooves formed in the sheaves because the tension decay per unit angle of cable wrap is greater in grooves having small or narrow V-angles. Furthermore, any reduction in the number of degrees in the V-angle of a grooved sheave causes a corresponding increase in the shear load per unit length of cable wrap. When armorless ocean communication cable is being handled by such sheaves, the shear load may become so large near the high tension tangent point on the outboard sheave as to produce internal axial slippage of the cable components.

The possibility of such damage to an armorless cable is minimized in accordance with this invention by so constructing and arranging the sheaves A, B, C, and D that the number of degrees in the V-angles of their respective grooves 12, 12', 12'', and 12''' increases progressively from the sheave A at the low tension end of the engine 4 to the sheave D at the high tension end of the engine 4. This construction and arrangement is illustrated in FIGS. 2A, 2B, 2C, and 2D and, more particularly, in FIGS. 3A, 3B, 3C, and 3D.

However, when an armorless cable is wrapped on a drum having a flat peripheral surface, there will normally be no internal axial slippage of the cable components. Therefore, in a cable engine of the multiple sheave type, it would be desirable for the outboard sheave, which is at the point of maximum cable tension, to be constructed with a flat circumferential tread. In other words, it is so constructed that the number of degrees in its V-groove angle is 180.

Ocean communication cable is usually provided with instrumentality housings 13, such as repeaters, which form enlargements in the cable at spaced intervals. In order to guide the passage of these housing members 13 over the circumferential surfaces of the sheaves A, B, C, and D, the sheaves A, B, C, and D are provided with flanged edges 14 which curve inwardly toward their respectively associated grooves 12, 12', 12'', and 12''' so as to form a trough for the repeaters 13.

For any particular combination of cable engine configuration and cable properties, it is desirable to utilize the largest possible over-all tension ration which can be used without damaging the armorless cable. For a specific set of values of allowable shear force per unit length, coefficient of friction, sheave radius, wrap angle per sheave, and number of sheaves, the optimum condition can be obtained by choosing the V-angle for the grooves in the various sheaves so that the maximum shear load per unit length of cable on each sheave is equal to:

$$\frac{fT_0}{R}$$

where $f$ is the coefficient of friction between the cable and the surfaces of the sheaves, $T_0$ is the outboard tension in the cable, and $R$ is the sheave radius.

The allowable shear force per unit length for a particular armorless cable will depend upon the magnitudes and angular orientations of the unit contact forces as well as upon the cable properties. If a maximum shear force per unit length is specified, then the V-groove angle for the optimum condition is equal to:

$$\sin \frac{a_n}{2} = \frac{T_{(n-1)}}{T_0}$$

where $a_n$ is the included V-groove angle of the $n$th sheave, $T_n$ is the tension inboard of the $n$th sheave, and $T_0$ is the tension outboard of the entire cable engine.

What is claimed is:

1. Cable-handling apparatus adapted to minimize the production of internal axial slippage of the components of armorless ocean cable during the handling thereof under tension, said apparatus comprising a cable-handling engine having a succession of V-grooved sheaves mounted to operate in tandem for controlling the rate of movement of armorless ocean cable passing through said engine from a point of low cable tension at one end of said engine to a point of high cable tension at the other end of said engine, each of said sheaves being adapted to receive a portion of said cable within its V-groove for at least partially restraining the rate of movement of said cable, each of said grooves being so formed that the number of degrees in its V-angle is different from the number of degrees in the V-angles of each of the other grooves, and said sheaves being so constructed and arranged that the number of degrees in the V-angles of their respective grooves increases progressively from the sheave at the low tension end of said engine to the sheave at the high tension end of said engine.

2. Cable-handling apparatus in accordance with claim 1 wherein the sheave at the high tension end of said cable-handling engine is constructed with a V-groove angle of 180 degrees.

3. Cable-handling apparatus in accordance with claim 1 wherein and further comprising guide means adapted 1 and further comprising guide means adapted to guide the passage of cable enlargements over the circumferential surfaces of each of said sheaves in sequence, said guide means including a projecting rim on each side of each of said sheaves, and said rims being so constructed and arranged as to curve inwardly toward their respectively associated grooves.

4. Cable-handling apparatus in accordance with claim 1 wherein the V-angles of the grooves in said sheaves are so constructed as to provide a maximum shear load per unit length on each of said sheaves that ies equal to $$\frac{fT_0}{R}$$

wherein $f$ is the coefficient of friction between a cable and the circumferential surfaces of said sheaves, $T_0$ is the cable tension at the high tension end of said cable-handling engine, and R is the radius of the sheaves.

5. Apparatus for reducing internal axial slippage of the components of armorless ocean cable during the handling thereof, said apparatus comprising a cable-handling engine having a succession of V-grooved sheaves adapted to operate in tandem for conveying an armorless ocean cable from a point of low cable tension to a point of high cable tension, each of said sheaves being adapted to restrain the movement of a cable wrapped around its respective V-groove, said V-grooves being so formed that each has an angle different from the others, said sheaves being so constructed and arranged that the angle of the V-groove in each of said sheaves increases progressively from the point of low cable tension to the point of high cable tension, and said V-groove angles being fixed in accordance with the equation:

$$\sin \frac{a_n}{2} = \frac{T_{(n-1)}}{T_0}$$

wherein $a_n$ is the included V-groove angle of the $n$th sheave, $T_n$ is the cable tension at the low tension side of the $n$th sheave, and $T_0$ is the cable tension at the high tension end of said cable-handling engine.

References Cited in the file of this patent

UNITED STATES PATENTS

| | | |
|---|---|---|
| 259,190 | Meatyard | June 6, 1882 |
| 2,782,906 | Lidderdale | Feb. 26, 1957 |
| 2,924,328 | Lidderdale | Feb. 9, 1960 |